US009836846B2

(12) United States Patent
Lucey (10) Patent No.: US 9,836,846 B2
(45) Date of Patent: Dec. 5, 2017

(54) SYSTEM AND METHOD OF ESTIMATING 3D FACIAL GEOMETRY

(71) Applicant: COMMONWEALTH SCIENTIFIC AND INDUSTRIAL RESEARCH ORGANISATION, Campbell, ACT (AU)

(72) Inventor: Simon Lucey, Campbell (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 77 days.

(21) Appl. No.: 14/899,700

(22) PCT Filed: Jun. 19, 2014

(86) PCT No.: PCT/AU2014/050081
§ 371 (c)(1),
(2) Date: Dec. 18, 2015

(87) PCT Pub. No.: WO2014/201521
PCT Pub. Date: Dec. 24, 2014

(65) Prior Publication Data
US 2016/0140719 A1     May 19, 2016

(30) Foreign Application Priority Data
Jun. 19, 2013   (AU) ............................... 2013902225

(51) Int. Cl.
*G06K 9/00*     (2006.01)
*G06T 7/00*     (2017.01)
(Continued)

(52) U.S. Cl.
CPC ............ *G06T 7/0065* (2013.01); *G01B 11/02* (2013.01); *G01B 11/24* (2013.01);
(Continued)

(58) Field of Classification Search
CPC .......... G06T 17/00; G06T 2207/20024; G06T 2207/30201; G06T 3/40; G06T 7/55; G06T 7/62; G06K 9/00228
See application file for complete search history.

(56) References Cited

U.S. PATENT DOCUMENTS 6,072,903 A  *  6/2000  Maki ....................... G06T 7/251
                                                    348/169
7,016,824 B2 *  3/2006  Waupotitsch ........... G06T 19/00
                                                    345/419
(Continued)

OTHER PUBLICATIONS

Tang, Li-an, and Thomas S. Huang. "Automatic construction of 3D human face models based on 2D images." Image Processing, 1996. Proceedings., International Conference on. vol. 3. IEEE, 1996.*
(Continued)

*Primary Examiner* — Li Liu
(74) *Attorney, Agent, or Firm* — Kilpatrick Townsend & Stockton LLP (57) ABSTRACT

The present invention relates to image analysis. In particular, but not limited to, the invention relates to estimating 3D facial geometry. First, images are acquired 205 of an object, typically a face. Then a first three-dimensional (3D) geometry of the object is estimated 215 based upon at least the first image. A calibration image of the object and a calibration rig 120 is acquired 405. A scaling factor is determined 420 of the first 3D geometry based upon the calibration image, a known size of the calibration rig 120 and a predetermined spatial configuration. Finally, scaling the first 3D geometry using the scaling factor. The invention also concerns a system and software.

18 Claims, 6 Drawing Sheets

(51) Int. Cl.
*G01B 11/24* (2006.01)
*G06T 17/00* (2006.01)
*G01B 11/02* (2006.01)
*G06T 3/40* (2006.01)
*G06T 7/55* (2017.01)
*G06T 7/62* (2017.01)

(52) U.S. Cl.
CPC ............ *G06K 9/00228* (2013.01); *G06T 3/40* (2013.01); *G06T 7/55* (2017.01); *G06T 7/62* (2017.01); *G06T 17/00* (2013.01); *G06T 2207/20024* (2013.01); *G06T 2207/20076* (2013.01); *G06T 2207/20081* (2013.01); *G06T 2207/30201* (2013.01)

(56) References Cited

U.S. PATENT DOCUMENTS

| | | | |
|---|---|---|---|
| 7,508,977 B2 | 3/2009 | Lyons et al. | |
| 7,646,909 B2 | 1/2010 | Jiang et al. | |
| 2003/0231175 A1* | 12/2003 | Pfister | G06T 17/20 345/419 |
| 2004/0015327 A1* | 1/2004 | Sachdeva | A61C 7/00 702/167 |
| 2005/0162419 A1 | 7/2005 | Kim et al. | |
| 2009/0051683 A1* | 2/2009 | Goonetilleke | A43D 1/025 345/419 |
| 2010/0145898 A1* | 6/2010 | Malfliet | A61C 19/04 706/47 |
| 2010/0150406 A1* | 6/2010 | Xiao | G06K 9/00261 382/118 |
| 2011/0299771 A1 | 12/2011 | Cheddad et al. | |
| 2013/0108121 A1* | 5/2013 | de Jong | G06K 9/00 382/111 |
| 2013/0287294 A1* | 10/2013 | Ye | G06T 15/04 382/154 |
| 2014/0043329 A1* | 2/2014 | Wang | G06T 17/20 345/420 |
| 2014/0379356 A1* | 12/2014 | Sachdeva | A61C 7/002 705/2 |
| 2015/0055085 A1* | 2/2015 | Fonte | G06Q 30/0621 351/178 |

OTHER PUBLICATIONS

Ng, "PDA Face Recognition System Using Advanced Correlation filters", 2005 https://www.ece.cmu.edu/research/publications/2005/CMU-ECE-2005-007.pdf.
Paysan et al., "A 3D Face Model for Pose and Illumination Invariant Face Recognition", Proceedings of the 6th IEEE International Conference on Advanced Video and Signal Based Surveillance (AVSS) for Security, Safety and Monitoring in Smart Environments, Genova (Italy), Sep. 2-4, 2009.
International Search Report and Written Opinion dated Jul. 28, 2014, issued for PCT/AU2014/050081, 10 pages.

* cited by examiner

SYSTEM AND METHOD OF ESTIMATING 3D FACIAL GEOMETRY

CROSS-REFERENCE TO RELATED APPLICATIONS

The present application is a National Stage of International Application No. PCT/AU2014/050081, filed Jun. 14, 2014, and which claims priority from Australian provisional patent application 2013902225, filed Jun. 19, 2013, the contents of which are incorporated herein by reference

FIELD OF THE INVENTION

The present invention relates to image analysis. In particular, although not exclusively, the invention relates to estimating 3D facial geometry.

BACKGROUND TO THE INVENTION

Online shopping has gained high popularity in recent years, as customers are able to shop at a time and place that suits them, and often at a lower price than in a traditional bricks-and-mortar store. Clothing and electronics are particularly popular items purchased by online shopping.

A problem with online shopping is that a customer cannot try on or test an item before purchase, as is often possible in a bricks-and-mortar store. Accordingly, certain customers perceive a higher risk associated with online purchases, and thus are reluctant to purchase online.

Several attempts have been made to alleviate this problem, for example by allowing customers to return items at a minimal cost. A problem with providing low or no cost returns for online purchases is that postage costs can become significant for a merchant, and such costs must eventually be borne by consumers through higher prices.

More recently, systems have been designed that enable customers to virtually "try-on" an item. For example, in the case of glasses and sunglasses, systems exist where the customer is able to upload an image of themselves, to which an image of a frame of the glasses is overlaid and presented to the customer. Certain systems also enable the use of video, wherein the frame of the glasses is overlaid over several images that form a video sequence.

Such systems may help a customer choose a style of glasses, but provide little information with respect to how the glasses fit the customer. For example, a certain pair of glasses may, despite having a suitable style, be too large or too small for a customer.

Other systems exist where a customer is able to upload his or her measurements, to which a fit of an item is determined. The customer can then be informed if the item is likely to be too large or too small. Such systems require, however, detailed input from the customer, which can be time consuming to provide. Similarly, certain items, such as glasses, fit to a shape of a face rather than to typical clothing measurements, and thus systems that merely process basic measurements are not particularly suited to these items.

Accordingly, there is a need for an improved method and system of estimating 3D facial geometry.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to a first aspect, the invention resides in a method of estimating a three dimensional geometry of an object including:
acquiring a first image of the object;
estimating a first three-dimensional (3D) geometry of the object based upon at least the first image;
acquiring a calibration image of the object and a calibration rig, wherein the calibration rig has a known size and the calibration rig and the object are in a predetermined spatial configuration;
determining a scaling factor of the first 3D geometry based upon the calibration image, the known size of the calibration rig and the predetermined spatial configuration; and
scaling the first 3D geometry using the scaling factor.

Preferably, the object is a face of a person.

Preferably, the method further comprises acquiring a first plurality of images of the object, wherein the first 3D geometry of the object is generated based upon at least a subset of the first plurality of images.

Preferably, the subset of the first plurality of images is selected based upon a pose of the object in each of the subset of images.

Preferably, selecting the subset of the first plurality of images comprises:
determining a pose of the object in each of the first plurality of images;
clustering the first plurality of images based upon the poses; and
selecting an image from each cluster.

Preferably, the object is a face of a person, and determining the pose of the face comprises fitting a cylindrical model to the face.

Preferably, estimating the first 3D geometry of the object is based at least in part on occlusion boundary edges of the object and a geometric consistency across the first plurality of images.

Preferably, the method further comprises:
estimating boundary edges of the object in the subset of images;
detecting features of the object in each of the subset of images using a correlation filter;
performing bundle adjustment across the subset of images for geometric consistency; and
applying a Lambertian appearance constraint on the subset of images.

Preferably, estimating boundary edges of the object comprises:
generating probability maps based upon a colour component of the image.

Preferably, the colour component comprises a red-chrominance component of the image.

Preferably, detecting features of the object is further based upon view specific models generated based upon training data.

Preferably, performing bundle adjustment comprises:
estimating a plurality of feature points of the object in the plurality of images;
transforming the feature points to compensate for pose variations; and aligning the transformed feature points with corresponding feature points in neighbouring images.

Preferably, the neighbouring images comprise three neighbouring images.

Preferably, determining a scaling factor of the first 3D geometry comprises:
  estimating a pose of the calibration rig in the calibration image; and
  estimating a pose of the object in the calibration image, wherein
  determining the scaling factor is further based upon the estimated poses of the calibration rig and the object in the calibration image.

Preferably, the predetermined configuration between the calibration rig and the object comprises the calibration rig touching the object.

Preferably, the method further comprises rendering a virtual item on the three-dimensional object.

Preferably, the virtual item comprises eye glasses.

According to a second aspect, the invention resides in a system for estimating a three-dimensional geometry of an object, the system comprising:
  a calibration rig;
  a camera;
  a processor coupled to the camera; and
  a memory coupled to the processor, the memory including instruction code executable by the processor for:
    acquiring a first image of the object using the camera;
    estimating a first 3D geometry of the object based upon at least the first image;
    acquiring a calibration image of the object and the calibration rig, wherein the calibration rig and the object are in a predetermined spatial configuration;
    determining a scaling factor of the first 3D geometry based upon a known size of the calibration rig and the predetermined spatial configuration; and
    scaling the first 3D geometry using the scaling factor.

Preferably, the calibration rig comprises an electronic device displaying a QR code.

According to a third aspect, the invention resides in software, that when executed by a processor, causes the processor to perform the method of the first aspect and any of its preferable features described above.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise systems and methods of generating facial measurements. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in a method of estimating a three dimensional geometry of an object including: acquiring a first image of the object; estimating a first three-dimensional (3D) geometry of the object based upon at least the first image; acquiring a calibration image of the object and a calibration rig, wherein the calibration rig has a known size and the calibration rig and the object are in a predetermined spatial configuration; determining a scaling factor of the first 3D geometry based upon the calibration image, the known size of the calibration rig and the predetermined spatial configuration; and scaling the first 3D geometry based upon the scaling factor.

Advantages of certain embodiments of the present invention include an ability to quickly generate accurate facial measurements of a user, without requiring training of the user or complex registration of the user.

According to certain embodiments of the present invention, the user is able to virtually try on an item with high accuracy, quickly and without requiring the user to separately acquire their own measurements. Accordingly, certain embodiments of the present invention enable more efficient online shopping.

According to certain embodiments, the present invention can be used to enable online shopping for glasses, while reducing the risk of a poor fit of the glasses. This can in turn reduce costs for both the user and a merchant selling the glasses, as less returns need to be processed.

The below description focuses on generating three-dimensional geometry of a human face. However, as will be understood by the skilled addressee, three-dimensional geometries of other types of objects can be estimated by simple modification of the below description.

Figure 1:
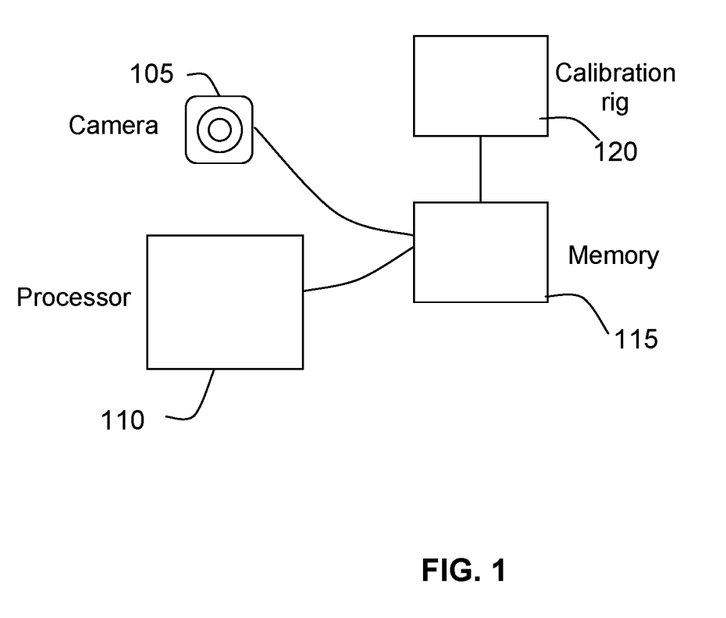
FIG. 1 illustrates a system for estimating 3D facial geometry, according to an embodiment of the present invention.

FIG. 1 illustrates a system 100 for generating facial measurements, according to an embodiment of the present invention.

The system includes a camera 105, for capturing images of a face of a user, a processor 110 coupled to the camera, and a memory 115 coupled to the processor 110. The system 110 further includes a calibration rig 120, for providing a known reference to the system.

The system 100 enables a user to capture a plurality of images of his or her face, advantageously over a wide range of poses. Preferably, at least 15 images of the user's face are captured, spanning poses from a far left of the user's face to a far right of the user's face.

The memory 115 includes instruction code, executable by the processor, for estimating a three-dimensional geometry of the face, from the plurality of images. As discussed further below, the facial geometry is estimated based upon a boundary edge detection, feature detection, bundle adjustment of images and a Lambertian appearance constraint. The geometry is initially scale ambiguous.

The instruction code further includes instructions for scaling the three-dimensional geometry of the face to a real world, using the calibration rig 120. As discussed further below, the calibration rig 120 enables the scale-distance ambiguity to be removed from the three-dimensional geometry of the face.

Figure 2:
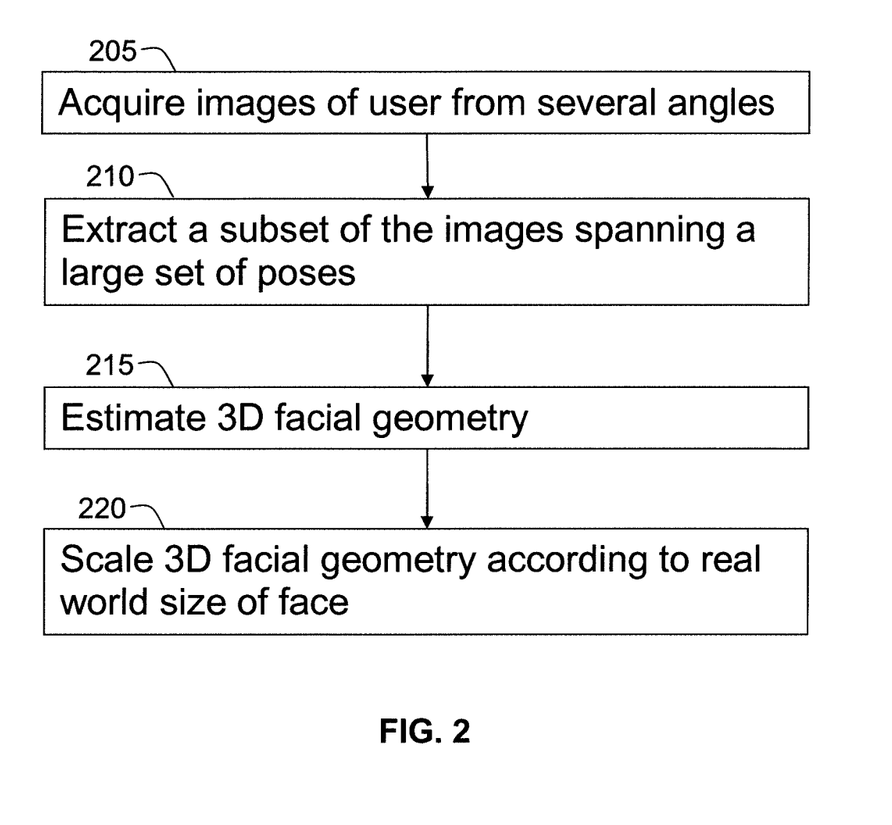
FIG. 2 illustrates a method of estimating 3D facial geometry, according to an embodiment of the present invention.

FIG. 2 illustrates a method 200 of generating a 3D geometry, according to an embodiment of the present invention.

In step 205, a plurality of images is acquired, of the user, and preferably from various angles. Suitably, at least fifteen images of the user are acquired, having various poses from far left to far right of the camera.

Preferably, the user should have a fixed, neutral expression in the plurality of images, however variations such as lighting are likely to be present.

The plurality of images can be acquired using a camera, or otherwise be provided by a user. It is, however, preferable to capture the images automatically and in real time, to simplify any interaction with the user and reduce the amount of input required by the user.

In step 210, frame extraction is performed to select a subset of the plurality of images that span a large set of poses. Extracting and processing only a subset of the plurality of images serves to reduce the computational complexity of the method 200 compared to processing all of the plurality of images. However, as will be readily understood by the skilled addressee, step 210 is optional and according to certain embodiments all of the plurality of images are processed.

In order to select the subset of images, a 6-degree-of-freedom (DOF) pose of the user's head in each frame of the plurality of frames is estimated using a cylinder head model tracker. The head is modelled as a cylinder and visual features of the face are tracked by constraining their 3D coordinates to lie on a surface of the cylinder.

Parameters of the cylindrical model can be set using details of a face in a frontal and upright pose, which can be obtained using a simple face detection algorithm.

Once the 6-degree-of-freedom pose of the user's head is determined for each image of the plurality of images, a subset of said plurality of images is chosen based upon the poses. According to certain embodiments, images are clustered based upon pose, and one image is chosen from each cluster.

In step 215, a scale ambiguous three-dimensional geometry of the face is estimated. The three-dimensional geometry is estimated considering occlusion boundary edges, learned local facial feature appearances, geometric consistency between images, and/or appearance similarity between neighbouring frames.

These features are considered while constraining the estimated geometry to lie in a subspace of plausible faces through the use of a facial model, such as a facial model according to the Basel morphable model dataset of the University of Basel (P. Paysan, R. Knothe, B. Amberg, S. Romdhani, and T. Vetter, "A 3D Face Model for Pose and Illumination Invariant Face Recognition", In Proceedings of the 6th IEEE International Conference on Advanced Video and Signal based Surveillance (AVSS) for Security, Safety and Monitoring in Smart Environments, Genova (Italy), Sep. 2-4, 2009).

Estimating a scale ambiguous three-dimensional geometry of a face is described in further detail below with reference to FIG. 3.

In step 220, the scale ambiguous three-dimensional geometry of the face is scaled according to a real world size of the face. This can be used to take into account size differences in an image caused by a distance between the face and the camera.

This is achieved using a calibration rig, as discussed in further detail with reference to FIG. 4.

Measurements can be taken on the scaled three-dimensional geometry. In particular, if obtaining measurements for fitting glasses, measurements are obtained across the face and from ear to ear.

Alternatively or additionally, virtual objects can be fitted to the face at a correct scale once the measurements are generated. This enables the user to visually determine a fit of the glasses by looking for gaps and/or tight spots.

Figure 3:
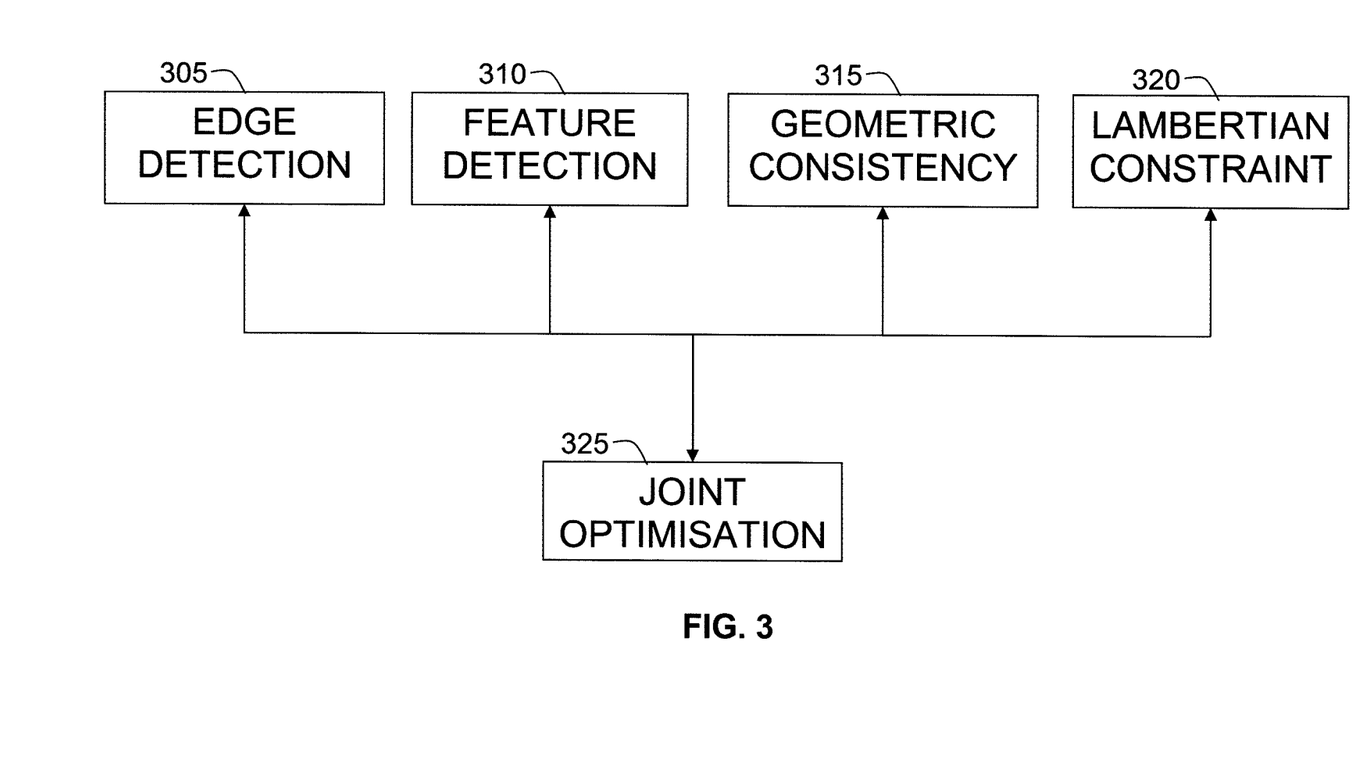
FIG. 3 illustrates a method of estimating a three-dimensional geometry of a face, according to an embodiment of the present invention.

FIG. 3 illustrates a method 300 of estimating a three-dimensional geometry of a face, according to an embodiment of the present invention. As discussed above, the face is captured in several images, and the method of estimating the three-dimensional geometry of a face can be performed on all or a subset of the facial images.

In step 305, edge detection is performed on the plurality of facial images to detect the occlusion boundaries of the face.

Obtaining accurate boundaries is an important feature when measuring a face of the user, as measurements will otherwise be erroneous. A three-dimensional morphable model can be fitted to each image by matching an occlusion boundary of the three-dimensional model to edges in the image.

An initial pose estimate for each image is then either generated or retrieved, and is used to render an "average" head onto the image to create a first face mask. The cylindrical model, described above for selection of a subset of images for processing, can be used to generate the initial pose estimate.

Using the first face mask, a colour histogram of the face and the background are built. The colour histograms are then used to generate foreground and background probability map images. These foreground and background probability map images are combined additively to generate a face-probability map.

Furthermore, a red-chrominance channel is extracted from each of the plurality of images, and the red-chrominance channel and the face-probability map are treated as independent cues to segment the face from the background.

The red-chrominance channel is often discriminative between the face and background, especially in indoor environments In order to generate an edge map defining the face, a laplacian smoothed approximation of each of the above cues is considered separately. Specifically, an objective function of the following form is minimised:

$$\min_{V} \ \|V - I\|_2^2 + \lambda(\|E \odot \nabla_x V\|_1 + \|E \odot \nabla_y V\|_1)$$

wherein I denotes the image cue, V is the result, E is the inverse of the edge magnitude of the original grayscale image and $\nabla_x$ and $\nabla_y$ are x- and y-gradient operators, respectively. Here, $\odot$ denotes the Hadamard (element wise) product. Thus, the solution to the objective function above is an approximately piecewise-constant image.

The piecewise-constant property is achieved through the L1-norm over the derivatives of the intensity values, where large changes tend to occur in regions of the image with strong gradient magnitudes. The parameter $\lambda$ controls the degree of smoothness in the result (i.e. the sizes of the piecewise constant regions). With a sufficiently large $\lambda$, irrelevant detail in the image can be removed.

As will be readily understood by the skilled addressee, the above objective function can be solved using an alternating direction method of multipliers (ADMM).

A clean edge map can then be generated using a Sobel edge detector, which is well known in the art, on the resulting image.

According to certain embodiments, the image around the face is cropped to remove excess background, and down-sampled. Edges are found in the cropped and down-sampled image as discussed above and later up-sampled and placed in a corresponding location of the original image. This cropping and down-sampling reduces complexity of the method 300.

The morphable model's occlusion boundary is then set to match the edges of the face boundary using the following objective function:

$$E_e(q, \{P_i\}_{i=1}^N) = \sum_{i=1}^{N} \sum_{j \in \Omega_i} \|n_{ij}^T(e_{ij} - \mathcal{P}(v_j; p_i))\|_1$$

Here, $\Omega_i$ denotes the set of vertices in the morphable model that lie on the occlusion boundary, given the pose in the $i^{th}$ image. The surface normals of the globally transformed morphable model shape are computed and those vertices $v_{ij}$ that exhibit substantial components of their normals orthogonal to the image plane are removed.

The remaining vertices lie along occlusion boundaries, but not necessarily boundaries between the face and the background. These might include, for example, the inner ear, and crevices around the nose, eyes and mouth. These vertices are removed from consideration by projecting the vertices onto the image and determining if they lie on the rendered face.

The parameter $e_{ij}$ denotes the peak value in the edge image $V_i$ computed along the projected normal direction $n_{ij}$ for vertex $v_{ij}$ and P is a projection of the vertices. The difference between the projected vertices and the peaks is used to refine the search in a similar manner to iterative closest point (ICP). This enables the method to be more resistant to poor initial estimates allowing the model to slide along the target surface.

The boundary set $\Omega_i$ and subsequent normals and correspondences are fixed for one iteration of the outer loop of the optimisation procedure in a similar fashion to ICP. These values are recomputed using the updated parameters as optimisation proceeds.

Finally, to encourage convergence from large initial perturbations but limit sensitivity to spurious edges, the search region along the normal direction is set to be a large value initially, but is subsequently reduced with each iteration of the outer loop.

In step 310, feature detection is performed using a multi-channel correlation filter. Specifically, the objective function for the multi-channel correlation filter takes the following form:

$$\min_{\{F_i\}_{i=1}^b} \ \sum_{j=1}^{N} \left\| R_j - \sum_{i=1}^{b} F_i * I_{ij} \right\|_F^2 + \lambda \sum_{i=1}^{b} \|F_i\|^2$$

where $R_j$ is the ideal response map for the $j^{th}$ with a peak centred on the facial feature of interest, $F_i$ is the filter for the $i^{th}$ image channel, of which there are b, and $I_{ij}$ is the $i^{th}$ channel of the $j^{th}$ training image. As discussed above, the objective function for the multi-channel correlation filter can be solved using an ADMM.

To ensure specificity of the multi-channel correlation filters, the pose space is discretised based on the yaw-angle and learned view-specific models at increments of 10 degrees. The facial features for which the models are learned are view specific as not all facial features are visible in all poses. Given an image and its associated pose as estimated above, the facial feature detectors corresponding to the view closest to the estimated pose are used.

The vertices of the morphable model are matched to the detected facial landmarks in the image using the following objective function:

$$E_c = \sum_{i=1}^{N} \sum_{j \in \Psi_i} \|c_{ij} - \mathcal{P}(v_j; p_i)\|_1$$

Here, $\Psi_i$ denote the set of pre-defined facial landmarks in the view corresponding to the pose in the $i^{th}$ image, $c_{ij}$ denotes the image coordinates of the $j^{th}$ landmark in the $i^{th}$ image and $v_j$ denotes the vertex in the morphable model corresponding to that facial landmark.

In step 315, bundle adjustment is performed across the plurality of images to ensure geometric consistency across images.

As discussed earlier, an initial estimate of the pose of the head is generated. Salient local image patches in and around the face are then sampled, and their correspondences are found in neighbouring images. Suitably, three neighbouring images on either side of the image in question are used.

With the estimated pose, each feature point is triangulated to get an initial estimate of the 3D coordinates of the feature point. Bundle adjustment is then performed on the image and the neighbouring images such that the three-dimensional co-ordinates are aligned.

The bundle adjustment can be performed using an objective function of the following form:

$$E_s(\{p_i\}_{i=1}^N, \{x_i\}_{i=1}^n) = \sum_{i=1}^{N} \sum_{j=1}^{n} w_{ij} \|\bar{x}_{ij} - \mathcal{P}(x_j; p_i)\|_1$$

where $\tilde{X}_{ij}$ denotes the coordinates of the $j^{th}$ point's correspondence in the $i^{th}$ image and the binary constant $w_{ij}$ specifies whether correspondence for the 3D point has been computed for the image. The function P denotes the projection of 3D points onto an image frame $x_j$ using the pose parameters $p_i$ and intrinsic camera parameters specific to the camera.

In step 320, a Lambertian appearance constraint is defined over the entire sequence.

The appearance of a convex lambertian object under diffuse lighting can be well represented using a low-rank matrix structure. This enables use of a joint appearance constraint over the entire sequence without the need to explicitly parameterise and solve for lighting parameters. Specifically, a Lambertian objective function of the following form is used:

$$E_l = \min_{D,E,A} \|D\|_* + \lambda_l \|E\|_1$$

where D=A+E; and $$\Phi_i(I_i \circ W(q;p_i) - A_i) = 0$$

Here, $\|\ \|_*$, denotes the nuclear-norm, which is a convex approximation for the matrix rank, $I_i$ denotes the grayscale $i^{th}$ image and W denotes a bilinear warping function that samples the image at the morphable model's projected vertex locations. The matrix $\Phi_i$ is a binary diagonal matrix with zeros along the diagonal corresponding to morphable model vertex indices that are self occluded. To minimise this objective function, the warped image is linearised using a first-order Taylor expansion and the selection matrix $\Phi_i$ is defined given the current estimates of q and $p_i$. Both the linearisation and the selection matrix is assumed fixed for a single iteration of the algorithm's outer loop.

In step 325, joint optimisation of the objective functions of steps 305-320 is performed. These elements are solved jointly and over all images. This can include solving an objective function of the following form:

$$\min_{q, \{p_i\}_{i=1}^{N}, \{x_i\}_{i=1}^{n}} E_l + \lambda_c E_c + \lambda_e E_e + \lambda_s E_s$$

Here, $E_l$, $E_c$, $E_e$, and $E_s$ denote the lambertian objective function, feature detection objective function, edge detection objective function and bundle adjustment objective function respectively, each of which is discussed above. $\lambda_c$, $\lambda_e$ and $\lambda_s$ correspond to weights for the feature detection objective function, edge detection objective function and bundle adjustment objective function respectively, and denote the importance of each objective function to the joint optimisation. The parameter q denotes the non-rigid deformation parameters of the 3D morphable model, $p_i$ denotes the 6-DOF pose parameter vector for the $i^{th}$ image, and $x_i$ denotes the $i^{th}$ 3D point corresponding to the detected salient feature points in the images used in the bundle adjustment.

To solve the above joint optimisation, any nonlinearities stemming from the image measurements or camera projection are first linearised using a first order Taylor expansion. The resulting objective function is then convex, which affords a globally optimal solution. This process is then repeated, linearising the nonlinearities around each estimate.

After fixing render-dependent parameters and linearising vertex projections and image warps, the objective function reduces to a form similar to that used in robust principle component analysis (PCA) and can be solved using techniques from ADMM in a similar manner to that described above.

Figure 4:
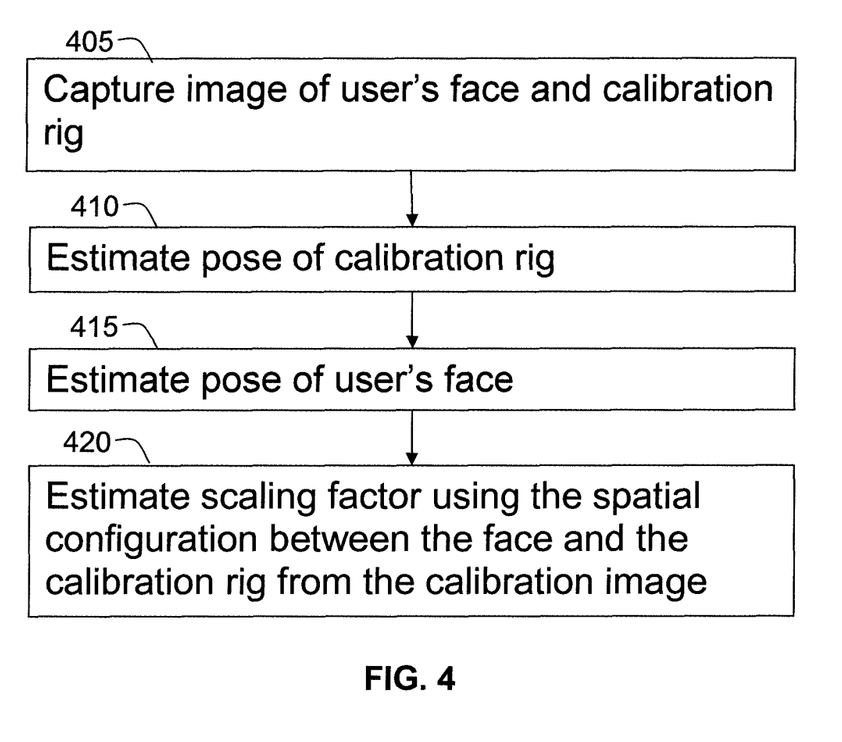
FIG. 4 illustrates a method of scale estimation, according to an embodiment of the present invention.

FIG. 4 illustrates a method 400 of scale estimation, according to an embodiment of the present invention. As discussed above, estimating a 3D geometry from multiple images results in a scale-distance ambiguity in that an object may appear larger when close to the camera, and small when further from the camera.

In step 405, an image of a scene containing the user's face and a calibration rig of known size and spatial configuration with respect to the user's face is captured. The image is hereon referred to as the calibration image.

The calibration rig comprises a smartphone or tablet PC displaying a known QR-pattern at a fixed location and size. According to alternative embodiments, a static calibration board such as a checkerboard pattern is used.

The calibration rig is captured while touching the face of the user in the image, without assumption about the specific pose-configuration of the calibration rig. Furthermore, no assumptions are made about the relative pose between the head, calibration rig and camera.

In step 410, the pose of the calibration rig in the calibration image is estimated based on its known size and pattern. Given a set of 2D point correspondences between the QR-pattern and that captured in the image, the pose of the calibration rig in the camera's reference frame can be solved.

The pose of the calibration rig is estimated by dividing the problem into two components; detection and registration. In the detection stage the coarse location and size of the QR pattern in the image is estimated. This is realised through a linear discriminative patch detector that is trained to discriminate between image patches centred on the pattern and background patches. Positive examples are synthetically generated by rendering the QR-pattern on the image using homographic warps modelling pose variation including up to 30 degrees in pitch, yaw and roll. Thus, the QR-pattern is required to be roughly front facing. The pattern can then be detected by performing normalised cross-correlation between the learned patch model and the image at varying scales. The location and size of the QR-pattern is determined using a peak-to-sidelobe ratio between the learned model and the image.

Given the rough location and scale of the QR pattern, the calibration rig's initial pose can be estimated and further refined though a registration process. To ensure robustness of the method, separate smaller linear discriminative patches over many local parts of the QR pattern are learned. During registration, the image is warped onto the QR template's reference frame using a homography computed using the estimate of the calibration rig's pose. The local patches are then searched for within this reference frame and their peaks re-transformed to the image using the inverse of the previously computed homography. This defines a set of 3D-to-2D correspondences between 3D coordinates on the calibration rig and the image. The rig's pose is then updated by solving for the update using a robust objective function to reduce sensitivity to spurious local patch detections as follows:

$$\min_{\Delta p} \sum_i \|c_i - \mathcal{P}(x_i; p + \Delta p)\|_1$$

Here, $c_i$ and $x_i$ denote a 2D and 3D component of a correspondence pair and $\Delta p$ is the update to the pose parameters. To solve this equation, the perspective camera projection function P is linearised and the resulting linear L1 problem is then solved using ADMM.

The detections are performed in the QR-template's reference frame. Thus, as the pose approaches the solution, image deformations due to perspective projections disappear and the local patches can detect the locations of their correspondences in the image with increasing precision.

In step 415, the pose of the head is determined in the calibration image.

Person and view-specific facial feature detectors, described above, are applied to the calibration image. The feature detectors are thus built specifically for the face of interest and are more discriminative and thus yield more precise detections than a generic detector. Furthermore, small errors are replicated in the calibration image and thus scale estimation is performed on a 3D geometry whose pose is matched with the capture process.

For example, if the chin is incorrectly detected in a capture sequence, this deviation will be preserved when fitting the calibration image. Thus, if the geometry for the other parts of the face are well estimated and the contact point between the calibration rig and the face lands on these good regions in the geometry, then any errors around the chin area will not affect the scale estimate.

In step 420, a scaling factor is estimated, to resize the face to its true size using the spatial configuration between the face and the calibration rig from the calibration image.

Given the absolute pose of the calibration rig and the scale-ambiguous pose of the face in the calibration image, the absolute size of the head can be found by finding the scale for which the face touches the calibration rig.

Figure 5:
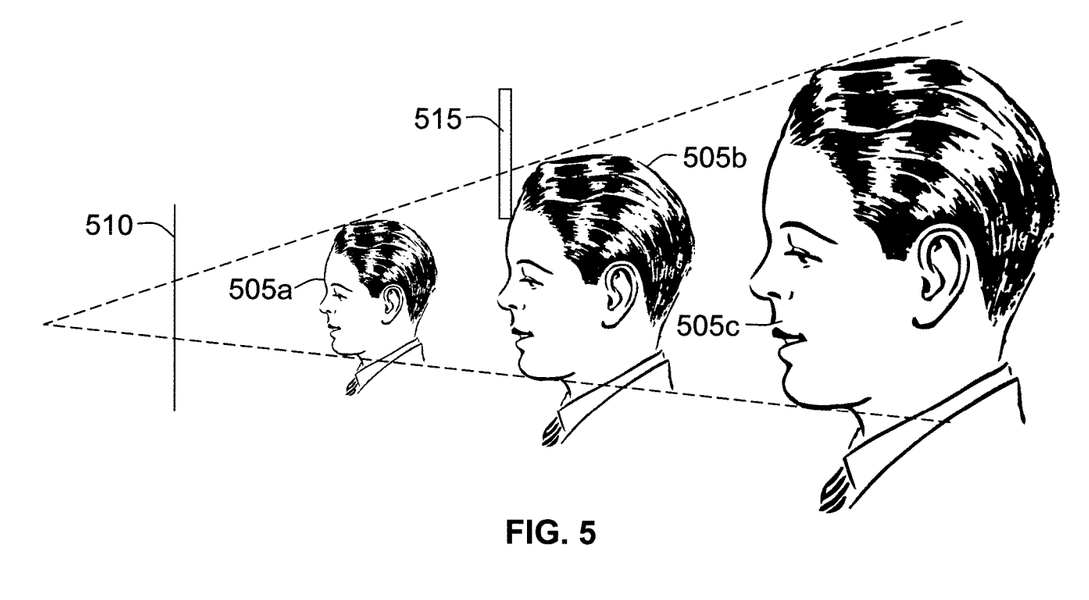
FIG. 5 graphically illustrates the scale calibration method of FIG. 4, according to an embodiment of the present invention.

FIG. 5 graphically illustrates the scale calibration method 400, according to an embodiment of the present invention.

The pose of the user's face is scale ambiguous as illustrated by first, second and third faces 505*a-c* at different positions. A small face is illustrated by the first face 505*a*, a medium sized face is illustrated by the second face 505*b* and a large face is illustrated by the third face 505*c*.

Each of the first, second and third faces 505*a-c* is projected onto an image plane 510 in a similar manner, resulting in near identical image projections despite being of different sizes. Thus, by considering facial images alone, a correct scale of the face cannot be determined.

A calibration rig 515, when placed against a face 505*a-c* can, as discussed above, be used to scale the face 505*a-c*, as the size and shape of the calibration rig 515 is known.

Figure 6:
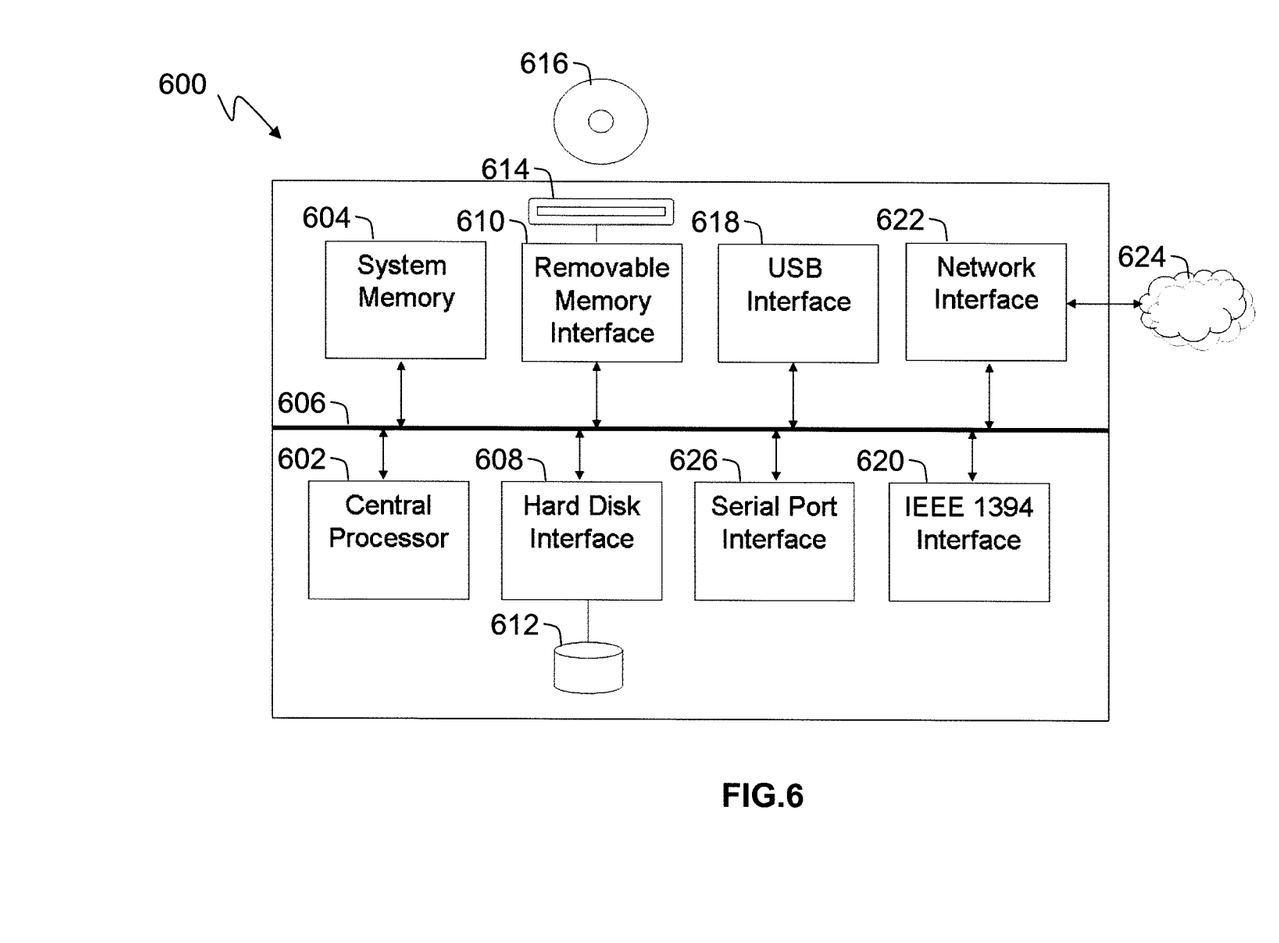
FIG. 6 diagrammatically illustrates a computing device, according to an embodiment of the present invention.

FIG. 6 diagrammatically illustrates a computing device 600, according to an embodiment of the present invention. The system 100 of FIG. 1 can be similar or identical to the computing device 600. Similarly, the methods 200, 300, 400 of FIGS. 2-4 can be implemented using the computing device 600.

The computing device 600 includes a central processor 602, a system memory 604 and a system bus 606 that couples various system components, including coupling the system memory 604 to the central processor 602. The system bus 606 may be any of several types of bus structures including a memory bus or memory controller, a peripheral bus, and a local bus using any of a variety of bus architectures. The structure of system memory 604 is well known to those skilled in the art and may include a basic input/output system (BIOS) stored in a read only memory (ROM) and one or more program modules such as operating systems, application programs and program data stored in random access memory (RAM).

The computing device 600 can also include a variety of interface units and drives for reading and writing data. The data can include, for example, a QR pattern or training data.

In particular, the computing device 600 includes a data storage interface 608 and a removable memory interface 610, respectively coupling a solid state or hard disk drive 612 and a removable memory drive 614 to the system bus 606. Examples of removable memory drives 614 include magnetic disk drives and optical disk drives. The drives and their associated computer-readable media, such as a Digital Versatile Disc (DVD) 616 provide non-volatile storage of computer readable instructions, data structures, program modules and other data for the computer system 600. A single hard disk drive 612 and a single removable memory drive 614 are shown for illustration purposes only and with the understanding that the computing device 600 can include several similar drives. Furthermore, the computing device 600 can include drives for interfacing with other types of computer readable media.

The computing device 600 may include additional interfaces for connecting devices to the system bus 606. FIG. 6 shows a universal serial bus (USB) interface 618 which may be used to couple a device to the system bus 606. For example, an IEEE 1394 interface 620 may be used to couple additional devices to the computing device 600. Examples of additional devices include cameras for receiving images or video, or microphones for recording audio.

The computing device 600 can operate in a networked environment using logical connections to one or more remote computers or other devices, such as a server, a router, a network personal computer, a peer device or other common network node, a wireless telephone or wireless personal digital assistant. The computing device 600 includes a network interface 622 that couples the system bus 606 to a local area network (LAN) 624. Networking environments are commonplace in offices, enterprise-wide computer networks and home computer systems.

A wide area network (WAN), such as the Internet, can also be accessed by the computing device, for example via a modem unit connected to a serial port interface 626 or via the LAN 624.

Transmission of shape parameters and/or video can be performed using the LAN 624, the WAN, or a combination thereof.

It will be appreciated that the network connections shown and described are exemplary and other ways of establishing a communications link between computers can be used. The existence of any of various well-known protocols, such as TCP/IP, Ethernet, FTP, HTTP and the like, is presumed, and the computing device 600 can be operated in a client-server configuration to permit a user to retrieve data from, for example, a web-based server.

The operation of the computing device 600 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

In summary, advantages of certain embodiments of the present invention include an ability to quickly generate accurate facial measurements of a user, without requiring training of the user or complex registration of the user.

According to certain embodiments of the present invention, the user is able to virtually try on an item with high accuracy, quickly and without requiring the user to separately acquire their own measurements. Accordingly, certain embodiments of the present invention enable more efficient online shopping.

According to certain embodiments, the present invention can be used to enable online shopping of glasses, while reducing the risk of a poor fit of the glasses. This can in turn reduce costs for both the user and a merchant selling the glasses, as less returns need to be processed.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A method of estimating a three-dimensional geometry of an object including:
   acquiring a first plurality of images of an object;
   estimating a first three-dimensional (3D) geometry of the object based upon at least a subset of the first plurality of images,
   wherein estimating the first 3D geometry of the object comprises:
      estimating boundary edges of the object in the subset of the first plurality of images;
      detecting features of the object in the subset of the first plurality of images using a correlation filter;
      performing bundle adjustment across the subset of the first plurality of images for geometric consistency; and
      applying a Lambertian appearance constraint on the subset of the first plurality of images;
   acquiring a calibration image of both the object and a calibration rig, wherein the calibration rig has a known size, and the calibration rig and the object are in a predetermined spatial configuration;
   determining a scaling factor of the first 3D geometry based upon the calibration image, the known size of the calibration rig, and the predetermined spatial configuration; and
   scaling the first 3D geometry using the scaling factor.

2. The method of claim 1 wherein the object is a face of a person.

3. The method of claim 1, wherein the subset of the first plurality of images is selected based upon a pose of the object in each of the subset of the first plurality of images.

4. The method of claim 3, wherein selecting the subset of the first plurality of images comprises:
   determining a pose of the object in each of the first plurality of images;
   clustering the first plurality of images based upon the poses; and
   selecting an image from each cluster.

5. The method of claim 4, wherein the object is a face of a person, and determining the pose of the face comprises fitting a cylindrical model to the face.

6. The method of claim 1, wherein estimating the 3D geometry of the object is based at least in part on occlusion boundary edges of the object and a geometric consistency across the first plurality of images.

7. The method of claim 1, wherein estimating boundary edges of the object comprises:
   generating probability maps based upon a colour component of at least the subset of the first plurality of images.

8. The method of claim 7 wherein the colour component comprises a red-chrominance component of at least the subset of the first plurality of images.

9. The method of claim 1, wherein detecting features of the object is further based upon view specific models generated based upon training data.

10. The method of claim 1, wherein performing bundle adjustment comprises:
    estimating a plurality of feature points of the object in at least the subset of the first plurality of images;
    transforming the feature points to compensate for pose variations; and
    aligning the transformed feature points with corresponding feature points in neighbouring images.

11. The method of claim 10, wherein the neighbouring images comprise three neighbouring images.

12. The method of claim 1, wherein determining a scaling factor of the 3D geometry comprises:
    estimating a pose of the calibration rig in the calibration image; and
    estimating a pose of the object in the calibration image, wherein
    determining the scaling factor is further based upon the estimated poses of the calibration rig and the object from the calibration image.

13. The method of claim 1, wherein the predetermined configuration between the calibration rig and the object comprises the calibration rig touching the object.

14. The method of claim 1, further comprising rendering a virtual item on the three-dimensional object.

15. The method of claim 14, wherein the virtual item comprises eye glasses.

16. A non-transitory computer-readable medium, including computer-executable instructions stored thereon that when executed by a processor, causes the processor to perform the method of claim 1.

17. A system for estimating a three-dimensional geometry of an object, the system comprising:
    a calibration rig;
    a camera;
    a processor coupled to the camera; and
    a memory coupled to the processor, the memory including instruction code executable by the processor for:
       acquiring a first plurality of images of an object using the camera;
       estimating a three-dimensional (3D) geometry of the object based upon at least a subset of the first plurality of images, wherein estimating the first 3D geometry of the object comprises:
   estimating boundary edges of the object in the subset of the first plurality of images;
   detecting features of the object in the subset of the first plurality of images using a correlation filter;
   performing bundle adjustment across the subset of the first plurality of images for geometric consistency; and
   applying a Lambertian appearance constraint on the subset of the first plurality of images;
acquiring a calibration image of both the object and the calibration rig, wherein the calibration rig and the object are in a predetermined spatial configuration; and
determining a scaling factor of the 3D geometry based upon a known size of the calibration rig and the predetermined spatial configuration.

18. The system of claim 17, wherein the calibration rig comprises an electronic device displaying a QR code.

* * * * *